Aug. 25, 1942.   E. L. BAILEY   2,293,790
CIRCUIT CONTROLLING APPARATUS
Filed Dec. 28, 1939
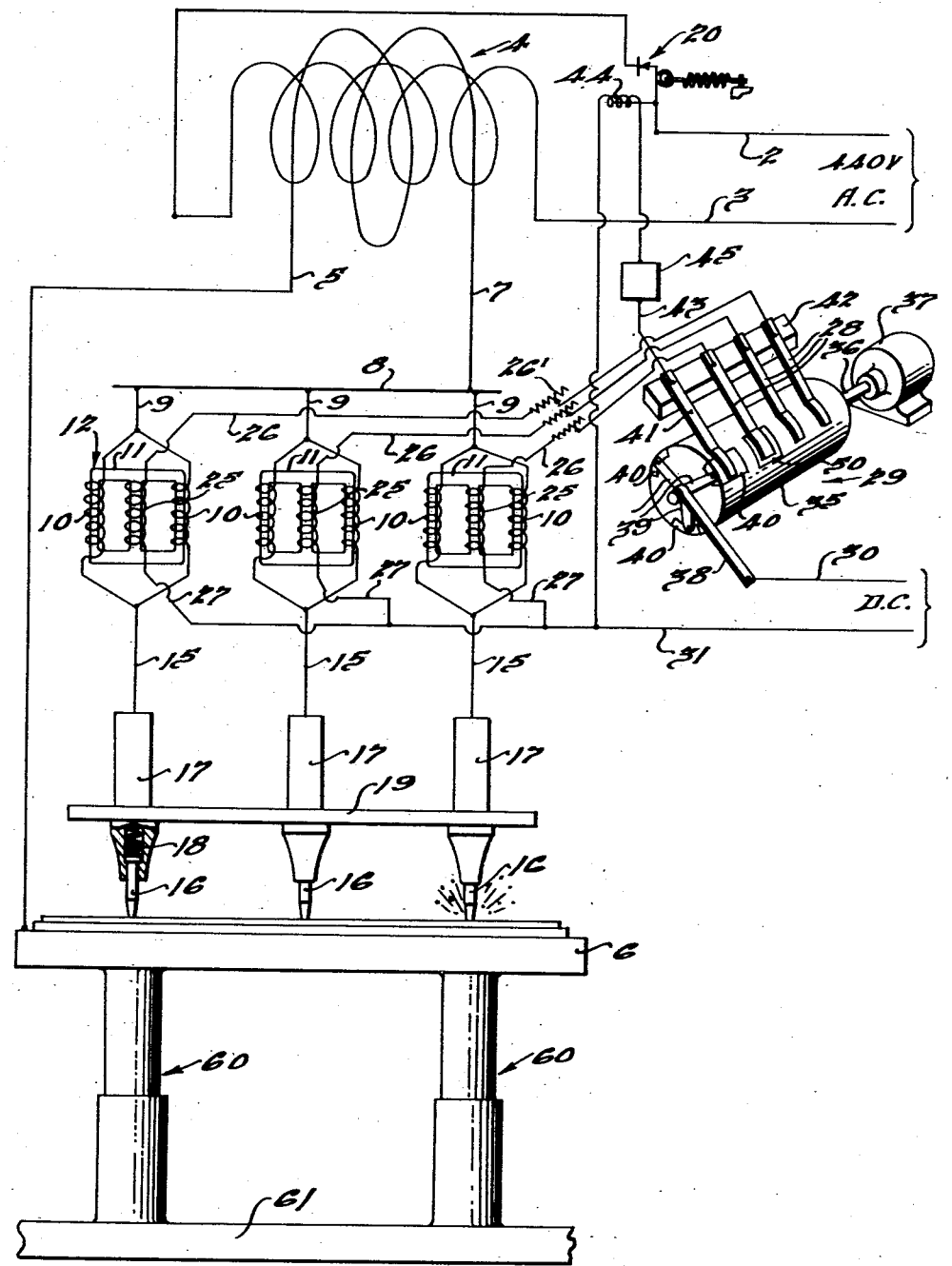
INVENTOR
Edgar L. Bailey,
BY Harness, Lind, Pater & Harris.
ATTORNEYS.

UNITED STATES PATENT OFFICE 2,293,790

CIRCUIT CONTROLLING APPARATUS

Edgar L. Bailey, Birmingham, Mich., assignor to Chrysler Corporation, Highland Park, Mich., a corporation of Delaware Application December 28, 1939, Serial No. 311,255

5 Claims. (Cl. 171—242)

This invention relates to circuit controlling apparatus for a multiple electrode welding machine, having particular regard to spot welding machines designed to weld metal parts together by means of a plurality of spaced electrodes.

The object of my invention is to provide multiple electrode spot welding apparatus with a control circuit whereby each electrode of the welding apparatus may be energized in sequence in order that the current supplied to the machine may be kept as low as possible. It is common parctice in the use of welding machines having a plurality of electrodes to avoid supplying the welding current at a high enough value to energize all of the electrodes simultaneously. It is expensive to supply current at a very high value, as well as dangerous, and the control of such a high current requires the use of large and extremely expensive circuit breakers, switches, and other apparatus. An object of the present invention is to provide an improved control system for sequentially supplying welding current to each of a plurality of electrodes individually.

The present apparatus is designed to supply alternating current of welding intensity to a plurality of electrodes which are simultaneously lowered and engaged with the work but which are sequentially energized so that a plurality of spot welding operations are performed in sequence.

A further advantage of the present invention is that proper engagement of the electrodes with the work pieces may be accomplished before a single welding operation is performed.

The present invention comprises a primary alternating current circuit connected to a plurality of secondary alternating current welding circuits in parallel with each other, each parallel welding circuit including a reactor having one leg thereof included in a direct current circuit energized sequentially with respect to other direct current circuits in parallel therewith by means of a commutator or other preset circuit controlling device. It is well known that the reactance of the alternating current windings of a reactor sets up magnetic fields within the iron cores thereof so that practically no current flows through the windings thereof unless the reactance in the windings is reduced by imposing a satisfying current on the reactor from another source. An object of the present invention is to take advantage of this phenomenon to control the flow of current to each of a plurality of electrodes of a multiple electrode welding machine so that the electrodes may be operated in sequence after once being located as a group, thus eliminating the necessity for opening large current carrying capacity circuits. Expensive and complicated apparatus of several different types have been devised for switching secondary welding circuits, and it is an object of the present invention to eliminate the necessity for such apparatus.

A further object of the invention is to provide in a control system of this kind improved means for individually predetermining the value of current intensity supplied to the respective welding electrodes of a plurality of electrodes.

The invention should be more readily understood by reference to the accompanying drawing wherein a preferred form of the apparatus is illustrated, the apparatus being set forth schematically with certain parts in perspective.

In such apparatus the primary power circuit comprises alternating current feed conductors 2 and 3 connected to the primary windings of a transformer 4. The secondary windings of the transformer 4 are so arranged as to reduce the alternating current in the secondary alternating current circuit to a current of welding intensity, and the secondary windings are connected by conductor 5 to the bed 6 of the welding machine and by conductor 7 to a busbar 8 to which a plurality of parallel branches 9 are connected. Each branch conductor 9 is connected to a pair of windings 10 about the outer legs of the iron core 11 of a reactor 12, the pair of windings 10 then being connected to a conductor 15 electrically connected to the welding electrode 16 which is suitably mounted in a holder 17 and urged outwardly by a spring 18 so that different heights of work may be engaged when the electrode platen 19 is lowered toward the bed 6. The electrodes 16 are insulated from each other preferably by making the platen 19 or the holders 17 of dielectric material. Current to the primary windings of the transformer 4 may be controlled by a solenoid actuated, spring opened switch 20 in the supply line 2.

The alternating current circuit so far described is incapable of supplying current to the electrodes 16 even though the switch 20 may be closed since the reactance of the reactors 12 prevents the flow of current through the conductors 15. In order that the flux of the cores may be created by other means, the intermediate leg of each core is provided with a winding 25 connected to a conductor 26 and a conductor 27, the conductor 26 being connected to a brush 28 of a commutator device 29 having a terminal thereof connected to one wire 30 of a direct current supply circuit and the conductor 27 being connected to the other wire 31 of the direct current supply circuit. Direct current at a predetermined amperage when flowing through the winding 25 satisfies the reactor 12 so that alternating current of welding intensity may flow through the electrode 16, and the commutating device 29 assures flow of direct current to only one direct current winding 25 at a time. Each conductor 26 is provided with a rheostat 26' by which is selectively predetermined the intensity of the direct current supplied to the coils 25. This selective control of the direct current of the coils 25 results in selective control of the welding current of each of the electrodes 16.

Many forms of commutating devices may be used, a simple form being shown in the drawing comprising a drum 35 mounted upon a shaft 36 connected to motor 37 by means of which the drum is rotated at a known speed. The shaft 36 engages a brush 38 connected to the wire 30 and is connected to a plurality of conductors 39 each of which is connected to a contact segment 40 engaged by a brush 41 mounted upon a dielectric member 42, the brush being connected to a conductor 43 which leads to the solenoid 44 of switch 20 and extends therefrom to the direct current supply wire 31. An adjustable timing switch 45 of any known variety is disposed in the conductor 43 for the purpose of pretermining the length of time that switch 20 is closed by the energization of solenoid 44. The drum 35 is also provided with a plurality of spaced contact segments 50 connected by conductors (not shown) to the shaft 36 and each of which is sequentially engaged by one of the brushes 28 which are also mounted upon the dielectric member 42.

In the operation of the commutating device the rotating drum causes one of the contact segments 40 to engage the brush 41 thereby energizing the solenoid 44 to close switch 20 which causes alternating current to saturate the core of each reactor 12. At substantially the same time one of the segments 50 engages one of the brushes 28 so that direct current is imposed upon one of the reactors 12 with the result that welding current flows through the material between the electrode 16 associated with that particular reactor and the bed 6, the other electrodes being inoperative even though alternating current is being supplied to the busbar 8 to which all of the electrodes are connected. The timing switch 45, after a predetermined interval of time, opens the circuit through the solenoid 44 even though brush 41 and segment 40 may yet be in engagement in order that the alternating current flow to the electrode may again be blocked by being forced to satisfy the magnetic flux of the core 11. The timing switch permits adjustment of the machine to various thicknesses of metal sheets so that welding current may be caused to flow through thick sheets long enough to weld them together and so that the machine may also be adjusted to operate for shorter periods of time without burning through thin sheets.

While I have illustrated and previously described a single form of commutating device, it should be apparent to those skilled in the art that other forms are suitable for the purpose. I have also described the electrodes 16 and the holder 17 as being mounted in a movable platen 19, whereas it should be apparent that the bed 6 may be movable toward a fixed electrode holding platen 19. For this purpose the bed 6 is herein shown as being mounted upon telescopic legs 60 having one portion thereof fixed to a floor plate 61 and the other portion thereof fixed to the bed 6 upon which the work is placed, the two portions of the legs being movable axially with respect to each other by any suitable well known means.

In the operation of the present device the pieces of material to be spot welded at spaced points are placed upon the bed 6 and adjusted to proper position so that each of the electrodes 16 engages the work at the proper point. The electrodes 16 are all simultaneously engaged with the work either by lowering the electrode upon the work or by raising the work to meet the electrodes. During this period the commutator drum 35 is stationary, preferably with the brush 41 between segments 40 so that current cannot be supplied to the solenoid 44, and the direct current supply line is disconnected from the source of supply so as to prevent accidents. When the electrodes have been properly engaged with the work the direct current supply is connected and commutating motor 37 started so that the drum 35 commences rotation. Simultaneous engagement of brush 41 with segment 40 and one of the brushes 28 with one of the segments 50 causes switch 20 to close and simultaneous flow of current through one of the coils 25. The direct current flowing through coil 25 satisfies the reactor 12 and welding current flows between the associated electrode 16 and the bed 6 to produce a spot weld at that point. The timing switch 45 opens the switch 20 at the proper instant even though brush 41 may remain in engagement with segment 40. Continued rotation of the drum 35 causes subsequent reoperation of another electrode 16 until a complete revolution of the drum 35 has caused energization of each electrode. The commutator motor 37 may be provided with any well known single revolution stop device so that reactuation of one or more of the electrodes may be rendered impossible, or in the event that the drum is large enough and moving slowly enough the operator may manually disconnect the motor 37 after actuation of all of the electrodes. The apparatus thus eliminates the necessity of making and breaking heavy alternating current circuits in the secondary portion of the alternating current circuit, thus protecting the workmen and also protecting the apparatus from excessive arcing.

While I have illustrated a single embodiment of my invention it will be apparent to those skilled in the art that various changes, modifications, substitutions, additions and omissions may be made therein without departing from the scope of my invention as set forth in the appended claims.

I claim:

1. A current timing circuit for sequentially energizing a plurality of operating devices comprising a plurality of such operating devices, a plurality of reactors, each one of said reactors being connected in series with one of said devices and all of said reactors being connected in parallel to each other, a transformer having one terminal of its secondary connected to all of said reactors and the other terminal of its secondary completing a closed circuit including all of said operating devices in parallel branches with said reactors, a source of alternating current including a second circuit connected to the primary of said transformer and a switch to close said second circuit, means to close said switch and maintain the same in closed position at spaced intervals whereby a voltage is imposed upon all of said reactors simultaneously, and means to impose direct current of sufficient intensity to satisfy the reactance of one of said reactors upon each of said reactors in sequence during the periods of time that said switch is in closed position whereby alternating current from the secondary of said transformer is transmitted through each of said devices in sequence.

2. A current timing circuit for sequentially energizing a plurality of operating devices comprising a plurality of such operating devices connected in parallel with a source of alternating current, a plurality of reactors each having alternating current windings in series with one of said operating devices and with said source of alternating current, direct current windings on each reactor connected to a source of direct current, a commutating device having a plurality of brushes each in series with the direct current windings of one of said reactors and said source of direct current, and means to operate said commutating device so as to impose direct current upon each reactor in sequence whereby each of said operating devices is supplied with alternating current in sequence.

3. A current timing circuit for sequentially energizing a plurality of operating devices comprising a plurality of such operating devices connected in parallel with a source of alternating current, a plurality of reactors each having alternating current windings in series with one of said operating devices and with said source of alternating current, direct current windings on each reactor connected to a source of direct current, a commutating device having a plurality of brushes each in series with the direct current windings of one of said reactors and said source of direct current, means to operate said commutating device so as to impose direct current upon each reactor in sequence whereby each of said operating devices is supplied with alternating current in sequence, a main switch for controlling the supply of alternating current to all of said reactors, and means to close said main switch simultaneously with energization of each of said direct current reactor windings by said commutating device.

4. A current timing circuit for sequentially energizing a plurality of operating devices comprising a plurality of such operating devices connected in parallel with a source of alternating current, a plurality of reactors each having alternating current windings in series with one of said operating devices and with said source of alternating current, direct current windings on each reactor connected to a source of direct current, a commutating device having a plurality of brushes each in series with the direct current windings of one of said reactors and said source of direct current, means to operate said commutating device so as to impose direct current upon each reactor in sequence whereby each of said operating devices is supplied with alternating current in sequence, a main switch for controlling the supply of alternating current to all of said reactors, means to close said main switch simultaneously with energization of each of said direct current reactor windings by said commutating device, and a timing switch in series with said main switch closing means to control the length of time of imposition of alternating current on said reactors.

5. A current timing circuit for sequentially energizing a plurality of operating devices comprising a plurality of such operating devices connected in parallel with a source of alternating current, a plurality of reactors each having alternating current windings in series with one of said operating devices and with said source of alternating current, direct current windings on each reactor connected to a source of direct current, a commutating device having a plurality of brushes each in series with the direct current windings of one of said reactors and said source of direct current, means to operate said commutating device so as to impose direct current upon each reactor in sequence whereby each of said operating devices is supplied with alternating current in sequence, a main switch for controlling the supply of alternating current to all of said reactors, means to close said main switch simultaneously with energization of each of said direct current reactor windings by said commutating device, and means to regulate the length of time that the main switch remains closed in order to control the length of time of imposition of alternating current on said reactors.

EDGAR L. BAILEY.